United States Patent
Drochon et al.

(10) Patent No.: US 9,303,203 B2
(45) Date of Patent: Apr. 5, 2016

(54) THERMOVISCOELASTIC SYSTEM FLUID AND WELL TREATMENT METHOD

(75) Inventors: Bruno Drochon, Missouri City, TX (US); Isabelle Couillet, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1159 days.

(21) Appl. No.: 11/749,200

(22) Filed: May 16, 2007

(65) Prior Publication Data

US 2007/0281869 A1 Dec. 6, 2007

Related U.S. Application Data

(60) Provisional application No. 60/804,056, filed on Jun. 6, 2006.

(51) Int. Cl.
| | |
|---|---|
| *C09K 8/66* | (2006.01) |
| *C09K 8/60* | (2006.01) |
| *C09K 8/68* | (2006.01) |
| *C09K 8/88* | (2006.01) |

(52) U.S. Cl.
CPC . *C09K 8/602* (2013.01); *C09K 8/68* (2013.01); *C09K 8/88* (2013.01); *C09K 2208/30* (2013.01)

(58) Field of Classification Search
None
See application file for complete search history.

(56) References Cited

U.S. PATENT DOCUMENTS

| | | | |
|---|---|---|---|
| 4,432,881 A | 2/1984 | Evani | |
| 4,440,228 A | 4/1984 | Swanson | |
| 4,951,921 A | 8/1990 | Stahl | |
| 5,096,603 A | 3/1992 | Peiffer | |
| 6,581,701 B2 | 6/2003 | Heying | |
| 6,878,754 B2 | 4/2005 | L'Alloret | |
| 7,160,931 B2 | 1/2007 | Cheng | |
| 7,193,007 B2 | 3/2007 | Cheng | |
| 7,427,583 B2 * | 9/2008 | Couillet et al. | 507/211 |
| 7,493,957 B2 * | 2/2009 | Nguyen et al. | 166/295 |
| 2004/0266629 A1 | 12/2004 | Maroy | |
| 2005/0107265 A1 | 5/2005 | Sullivan | |
| 2005/0107503 A1 * | 5/2005 | Couillet et al. | 524/249 |
| 2005/0230114 A1 * | 10/2005 | Eoff et al. | 166/295 |

FOREIGN PATENT DOCUMENTS

| | | |
|---|---|---|
| EP | 0583814 A1 | 2/1994 |
| EP | 1591619 A1 | 11/2005 |
| WO | 9526455 | 10/1995 |

\* cited by examiner

*Primary Examiner* — John J Figueroa (74) *Attorney, Agent, or Firm* — Jeffrey R. Anderson; Rachel Greene; Tim Curington (57) ABSTRACT

A thermoviscoelastic system (TVE) fluid useful in a well treatment method can include a hydrophobically-modified polymer and a viscoelastic surfactant (VES) in an aqueous medium, wherein the polymer has a lower critical solution temperature (LCST). The polymer can have water solubility for preparation below the LCST, and the TVE has a low viscosity for pumping down a well bore in communication with a subterranean formation. When the TVE is heated above the LCST, interaction between the hydrophobic groups of the polymer and the VES form a cross-linked network to increase the viscosity to transport proppant into a fracture. The thickened TVE can have a low leak-off rate, optionally including colloidal particles or other fluid loss control agent, and can be broken by contact with hydrocarbons as during flowback from the reservoir.

34 Claims, 2 Drawing Sheets

THERMOVISCOELASTIC SYSTEM FLUID AND WELL TREATMENT METHOD

CROSS REFERENCE TO RELATED APPLICATION

This application is entitled to the benefit of Provisional Patent Application U.S. Ser. No. 60/804,056 filed Jun. 6, 2006.

TECHNICAL FIELD OF THE INVENTION

This invention relates to fluids having a temperature-sensitive viscosity, and more particularly to thermosensitive fluids with a relatively low polymer concentration. The invention also relates to well treatment methods using thermosensitive fluids, and more particularly to the use of fluids having a relatively low polymer concentration with the potential for reducing or avoiding damage to subterranean formations for the production of reservoir fluids.

BACKGROUND OF THE INVENTION

Hydrocarbons, such as oil or natural gas, are obtained from hydrocarbon-bearing subterranean geologic formations by drilling wellbores which provide partial flow paths allowing the hydrocarbons to reach the surface. Hydrocarbons migrate via flow paths connecting a reservoir within a formation and a wellbore. However, impeded flow paths can lead to insufficient hydrocarbon production. In such cases, various techniques are used to stimulate the hydrocarbon production. For example, it is common to inject specialized fluids via the wellbore into the formation at sufficient pressures to create fractures in the formation rocks, thereby creating channels through which the hydrocarbons can more readily flow into the wellbore. This technique is referred to as fracturing, or hydraulic fracturing, and the specialized fluids used in the technique are referred to as fracturing fluids.

Ideally, a fracturing fluid imparts a minimal pressure drop in a pipe within the wellbore during placement and has an adequate viscosity to carry proppant material which prevents the fracture from closing. Moreover, the fracturing fluid should have a low leak-off rate, thereby inhibiting fluid migration into the formation rocks and promoting the creation and propagation of the fracture. Further, the fracturing fluid should degrade so as not to leave residual material which might prevent or inhibit hydrocarbon flow into the wellbore.

Early fracturing fluids included viscous or gelled oil, but with the understanding that damage due to water in certain formations may not be as important as originally thought, aqueous fracturing fluids including mainly linear polymeric gels comprising guar or hydroxyethyl cellulose were introduced. Cross-linked polymer gels, such as those based on guar crosslinked with borate or polymers crosslinked with metal ions, were also used to attain a sufficient fluid viscosity and thermal stability in high temperature reservoirs. Thermoviscosifying polymers, containing a hydrosoluble skeleton and side chains having a lower critical solution temperature property, and which have a viscosity which increases or stabilizes with temperature, were disclosed for cementation and fracturing in the oil industry in EP 583,814

However, as it became apparent that polymer residues might deteriorate the permeability of hydrocarbon bearing formations, fluids with lower polymer content were introduced. In addition, additives such as polymer breakers were introduced to improve the clean up of polymer-based fracturing fluids. Nevertheless, minimal formation damages were still attained only with polymer-free fracturing fluids comprising viscoelastic surfactants (VES).

Viscoelastic surfactant molecules, when present at a sufficient concentration, can aggregate into overlapping worm- or rod-like micelles, which confer the necessary viscosity to the fluid to carry the proppant during fracturing. At very high shear rates, e.g., above 170 $s^{-1}$, the viscosity can decrease, allowing the fluid to be pumped down the wellbore. Also, the surfactant worm- or rod-like micelles tend to disaggregate by contact with hydrocarbons, and without an effective surfactant emulsion, the surfactant molecules are normally carried along the fracture, to the well bore, during the hydrocarbon backflow. The principal advantages of VES fluids are ease of preparation, minimal formation damage and high retained permeability in the proppant pack. Viscoelastic surfactant fluids are disclosed, notably, in the patents published under the numbers U.S. Pat. No. 4,615,825, U.S. Pat. No. 4,725,372, U.S. Pat. No. 4,735,731, CA-1298697, U.S. Pat. No. 5,551,516, U.S. Pat. No. 5,964,295, U.S. Pat. No. 5,979,555 and U.S. Pat. No. 6,232,274. One well-known polymer-free aqueous fracturing fluid comprising a viscoelastic surfactant, which has been commercialized by the company group Schlumberger under the trade designation CLEARFRAC, is a mixture of the quaternary ammonium salt N-erucyl-N,N-bis (2-hydroxyethyl)-N-methyl ammonium chloride with isopropanol in a brine comprised of, for example, 3 weight percent ammonium chloride and 4 weight percent potassium chloride.

On the other hand, the leak-off rate of VES fracturing fluids is normally high, so they are mainly used with hydrocarbon bearing formations wherein the permeability of the formation rocks is low. In addition, the costs incurred by the use of high-concentration VES systems in aqueous wellbore service fluids, especially fracturing fluids, are elevated.

Polymers and surfactants are often used together in industrial formulations to take advantage of their characteristically different properties. One class of polymers which interact particularly strongly with surfactants is the class of hydrophobically modified water-soluble polymers. See U.S. Pat. No. 4,432,881 to Evani. Since contact between the hydrophobic groups and water is unfavorable, these polymers have a strong tendency to self-associate and/or to associate with surfactants. Progressive addition of surfactants which form spherical micelles typically gives rise to an increase in the viscosity of the solution, followed by a decrease in the viscosity at higher surfactant concentrations. The enhancement in viscosity is typically attributed to the formation of mixed micelles between the polymer alkyl chains and the surfactant molecules, reinforcing polymer intermolecular cross-links. The micelles solubilize alkyl groups belonging to more than one polymer chain, and the system becomes cross-linked.

The use of mixtures of hydrophobically modified polymers and VES for fracturing applications is known, for example, from US 2005/0107503. Those mixed systems present appreciable theological properties, good fluid clean up and sufficient fluid loss control. The hydrophobically-modified polymer, and notably pendant hydrophobic chains of the polymer, interact with the surfactant micelles. As a result, a viscoelastic gel structure can be created at relatively low concentrations of VES and hydrophobically-modified polymer, e.g. the VES below 20 times its overlap concentration and the hydrophobically-modified polymer below its entanglement concentration, thereby limiting cost. The fluid is hydrocarbon-responsive so that the gel structure breaks down on contact or mixing with hydrocarbons. The fluid has a leak-off rate which is below the leak-off rate of pure VES fluids of equivalent rheology. As a result, the fluid can be used to fracture higher permeability formations as compared to the pure VES fluids. The clean-up performance of the fluid is likely to be similar or better than that observed for a low concentration linear polymer fracturing fluid. Moreover, the fluid loss properties of the fluid can be improved by the addition of colloidal particles as reported in U.S. Pat. No. 7,081,439.

Unfortunately, the use of fluids with hydrophobically-modified polymers in the prior art presents a significant practical limitation, particularly for recovery of hydrocarbons. Hydrophobically modified polymers can have a slow hydration rate, making the onsite preparation of fluids containing them difficult and slow to prepare, especially at the injection well bore. The preparation of the treatment fluid at the surface of the well before its injection is important. The hydrophobically modified polymer component of the prior art VES-polymer well treatment fluids must thus be packaged in a liquid form, because if it is in a solid form, it cannot be easily and quickly hydrated.

Accordingly, there is a need for treatment fluids which are readily hydratable, have viscosity properties which enable efficient pumping and proppant transport down a borehole and have good clean up properties, and methods for treating subterranean formations using the fluids.

SUMMARY OF THE INVENTION

The invention provides fluids based on surfactants, such as viscoelastic surfactants (VES) or other surfactants, and hydrophilic polymers modified with functional groups exhibiting lower critical solution temperature (LCST) behavior. The term "thermoviscoelastic system" or TVE is defined herein as a system that is viscosified or thickened at a temperature above the LCST by the interaction between temperature-sensitive hydrophobic groups of a water soluble polymer and the micelles of a viscoelastic surfactant.

At temperatures below the LCST, the functional groups of the polymer is hydrophilic, which can allow a faster hydration compared to a conventional hydrophobically modified polymer. Thus, the thermosensitive polymer can be easily and quickly prepared in an aqueous solution even from a solid, for example, at an injection well site. Below the LCST the polymer chains can have limited self-association and limited interaction with VES micelles so that the fluid behaves like a low viscosity Newtonian or shear-thinning fluid. When the thermosensitive fluid is used in a method for treating a subterranean formation penetrated by a well bore for the recovery of hydrocarbons, it can be easily pumped into the well and fractures and/or the porous formation adjacent to the wellbore. Above the LCST, the functional groups become more hydrophobic, and can induce association between the polymer chains, and additionally or alternatively, between the polymer chains and the VES micelles. A viscoelastic gel structure can be created above the LCST at relatively low concentrations of the polymer and also of the VES in the case of mixtures. The thermosensitive fluid can exhibit a lower leak-off rate behavior as compared to a responsive fluid based on pure VES or crosslinked linear polymeric gel with equivalent rheology. The gel structure or network can be, for example, readily broken by contact with hydrocarbons during flow back to form a low viscosity fluid which can be easily removed.

In one embodiment, the invention provides a TVE fluid that can be useful, for example, in a well treatment fluid and/or method. The fluid can include a hydrophobically-modified polymer and a viscoelastic surfactant in an aqueous medium. The polymer can be characterized as having a lower critical solution temperature property. The fluid can thus have a low viscosity at a temperature just below the lower critical solution temperature relative to the fluid viscosity just above the lower critical solution temperature.

In another embodiment, the invention can provide a method of using the TVE fluid to treat a subterranean formation. In an embodiment the method can include preparing a formation treatment fluid based on a TVE, including a viscoelastic surfactant and a thermosensitive, hydrophobically-modified polymer, at a temperature below the LCST of the polymer, introducing the fluid into the subterranean formation, and increasing the temperature of the fluid to above the lower critical solution temperature of the polymer. In an embodiment, the method can include pumping the fluid through a wellbore in communication with the formation at a relatively low viscosity.

The fluid can pass through at least a portion of the well bore below the LCST of the polymer, where it can have a low viscosity to reduce surface injection pressure and pumping costs. The temperature increase above the LCST of the polymer can provide the fluid with a relatively high viscosity, e.g. for proppant transport into a fracture in the formation in one embodiment. In an embodiment, the presence of the polymer reduces fluid leak-off from the fracture. In another embodiment of the method, the fluid can be contacted with oil to break the viscosity, e.g. with oil from the formation, especially as during flow back from the reservoir in a more specific embodiment.

In some embodiments, the polymer can be present in the TVE at between its overlap concentration and its entanglement concentration. The polymer can be soluble in the aqueous medium below its lower critical solution temperature. In an embodiment, the VES and the hydrophobic groups of the polymer can interact above the LCST to viscosify the fluid.

The polymer can have a hydrophilic backbone and heat-sensitive hydrophobic side chains in an embodiment. The backbone can be selected from the group consisting of polysaccharides, polyanhydrides, polyacrylamides, polyacrylates, polyacrylate copolymers, polyethers, polyesters, polyamides, polyurethanes, polyvinylalcohols acrylic and acrylamide polymers and copolymers, polysaccharides, chitins, polyanhydrides, polyethers, polyesters, polyamides, polyvinylalcohols, chitins, and so on, and combinations thereof. The side chains can be polyethylene oxide, polypropylene oxide, or the like, or a combination thereof. In one embodiment, the polymer can have a polyurethane backbone and a mixture of polyethylene oxide and polypropylene oxide side chains.

In an embodiment, the polymer can have an LCST of between from 30° C. up to 200° C. The hydrophobically-modified polymer can have a weight average molecular weight between 10,000 and 10,000,000 g/mol, and especially from between 100,000 and approximately 2,000,000 g/mol in embodiments. In other embodiments, the hydrophobic side chains can have a substitution degree from 0.01 to 20, per average polymer chain unit.

In one embodiment, the VES is present from above its critical micelle concentration, and in other embodiments at from less than 30 or less than 20 times an overlap concentration (c*) of the viscoelastic surfactant, or from 0.2 to 5 times c*. In an embodiment, the viscoelastic surfactant is ionic, e.g. anioic, cationic, or zwitterionic.

In one embodiment, the VES can have the formula R—Z wherein R is a hydrophobic tail comprising a fully or partially saturated, linear or branched hydrocarbon chain of at least 18 carbon atoms, and Z is a polar head group comprising —NR1R2R3$^+$, —SO3$^-$, —COO$^-$ or —N$^+$(R1)(R2)(R3)-COO$^-$ where R1, R2 and R3 are each independently hydrogen or a fully or partially saturated, linear or branched aliphatic chain of at least one carbon atom, and wherein R1 or R2 may optionally comprise a terminal hydroxyl group.

In another embodiment, the VES can have the formula R—X—Y—Z wherein R is a hydrophobic tail comprising a fully or partially saturated, linear or branched hydrocarbon chain of at least 18 carbon atoms, X is a degradable acetal, amide, ether or ester bond, Y is a spacer group formed by a short fully or partially saturated hydrocarbon chain of at least one carbon atom, Z is a polar head group comprising —NR1R2R3$^+$, —SO3$^-$, —COO$^-$ or —N$^+$(R1)(R2)(R3)-COO$^-$ where R1, R2 and R3 are each independently hydrogen or a fully or partially saturated, linear or branched aliphatic chain of at least one carbon atom.

In another embodiment, the VES can include a betaine surfactant having the general formula R—N(R1)(R2)-Z, where Z is an alkyl group, or R—CN(R1)(R2)(R3)-Z, where Z is an acyl group, wherein R is an aliphatic or aromatic, straight or branched, saturated or unsaturated hydrophobic group, Z is an anionic group of the surfactant comprising —R'—SO3$^-$ or —R'—COO$^-$ where R' is a saturated aliphatic chain and R1, R2 and R3 are each independently hydrogen or an aliphatic chain of at least one carbon atom.

In another embodiment, the VES can be N-erucyl-N,N-bis (2-hydroxyethyl)-N-methyl ammonium chloride. In other embodiments, the VES can be an oleyl amide succinate.

In another embodiment, the polymer and the VES are present in the TVE at an aggregate concentration from less than 10 percent by weight, or from less than 5 percent by weight.

In another embodiment, the aqueous medium can include brine, e.g. salt at from 1 to 10 percent by weight.

In an embodiment, the TVE can have a viscosity sensitive to breaking by oil. The TVE can in one embodiment also include a proppant, or a fluid control agent such as colloidal particles.

In yet other embodiments of the invention, provided are fluids, and methods of using such fluids, based upon and hydrophilic polymers modified with functional groups exhibiting lower critical solution temperature (LCST) behavior optionally combined with a surfactant, or surfactants, which is not necessarily a viscoelastic surfactant.

DETAILED DESCRIPTION

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context.

As used herein a "thermoviscoelastic system" or "TVE" is a fluid system in which a viscoelastic surfactant or VES and a thermoassociative polymer are present at interactive concentrations. A thermoassociative polymer is defined as a polymer having associative chains and exhibiting a lower critical solution temperature (LCST) characteristic. As used herein, the LCST is the temperature at which a solution of the polymer in a dilute entanglement regime begins to exhibit a rapid viscosity increase upon heating at a low shear rate, such as about 10 $s^{-1}$, 5 $s^{-1}$, 1 $s^{-1}$, or less, or even under no effective induced shear. A viscosity increase is rapid if, compared to the viscosity 5° C. below the LCST, the viscosity 5° C. above the LCST upon continued heating increases by a factor of 10 or more.

Micelles are formed at very low surfactant concentration in water; the critical micelle concentration (c.m.c.) is the concentration at which micelles, practically spherical, start to form. The c.m.c. is commonly measured by surface tension, solubilisation, conductivity in the case of ionic surfactants, self-diffusion or NMR.

The overlap concentration c* of a viscoelastic surfactant is obtained by plotting the log of the zero shear viscosity of a water-based fluid comprising said viscoelastic surfactant as a function of the log of its concentration. A non-linear relationship is obtained and c* is the viscoelastic surfactant concentration which corresponds to the inflexion or break point between the two linear slopes formed by this curve.

As used herein, the overlap concentration of a thermosassociative polymer is determined above the LSCT. The plot of the log of the zero shear viscosity of the hydrophobically-modified polymer fluid as a function of the log of its concentration is characterised by two critical concentrations: (1) the overlap concentration c* and (2) the entanglement concentration ce. A curve is obtained and c* and ce are the hydrophobically-modified polymer concentrations which correspond to the two breaks points of the three slopes formed by this curve. The dilute regime is defined for hydrophobically-modified polymer concentrations c<c*. At such concentrations c, the zero shear viscosity is of the order of that of the solvent. The semi dilute unentangled regime is defined for hydrophobically-modified polymer concentrations strictly comprised between c* and ce. At such concentrations c, the viscoelasticity of the fluid is controlled by Rouse dynamics and the viscosity increases moderately. The semi dilute entangled regime is defined for hydrophobically-modified polymer concentrations c>ce. At such concentrations c, the viscosity of the fluid can be described by the reptation model.

Some embodiments of the invention relate to methods to improve oil recovery using a thermosensitive fluid in a TVE. The present invention in one embodiment, concerns an aqueous TVE for use in subterranean formations, in particular in exemplary operations such as drilling, completion, cleaning, fracturing, matrix treatment and gravel packing. The TVE is based on a thermoassociative polymer having associative chains presenting an LCST characteristic, and a VES. In one embodiment the associative chains are side chains which can be grafted, for example, onto the polymer backbone. At temperatures below the LCST, the associating chains of the polymer are substantially hydrophilic, thus, the polymer can quickly be dissolved or hydrated in water. Moreover, it is believed that at room temperature, the associative chains do not effectively interact with each other and cannot form any effective associations with the VES, so the TVE presents a low viscosity and can be easily pump into the fracture. The progressive increase of the fluid temperature, which in one embodiment can occur for example during pumping, leads to a modification of the properties of the side chains of the polymer, changing from hydrophilic to hydrophobic once the temperature reaches the LCST. Thus the VES micelles start to form a responsive crosslink between the hydrophobic groups on adjacent polymer molecules which leads to sufficient viscosity, in one embodiment, to transport proppant material in the fluid. The specific theological behavior of such polymeric systems arises from their ability, above the LCST, to give rise to weak intra- and inter-molecular interactions between the hydrophobic groups distributed along the polymer chains. In the semi dilute entangled regime, which is the domain of interest for most industrial applications, the hydrophobic moieties build up a transitory tridimensional network inter-penetrated with the entanglement network leading to an increase in the zero-shear viscosity when compared to the analogues without the hydrophobes.

The hydrophobic-modified polymer can be soluble in water. It can have an average molecular weight comprised between 10,000 and 10,000,000 g/mol and, preferably, between approximately 100,000 and approximately 2,000,000 g/mol. Above 2,000,000 and, definitely, above 10,000,000 g/mol, the polymer may form structures which are difficult to remove from the fracture during the subsequent backflow of formation fluids. Under 100,000 and, definitely, under 10,000 g/mol, the polymer concentration that would be necessary to obtain a fluid of the invention is likely to be too high hence increasing considerably the cost of the TVE fluid. The side chains can have an average molecular weight between about 100 and about 100,000 g/mol.

The heat-sensitive chains can be fixed on-(grafting) or incorporated in-(copolymerization) the macromolecular structure considered, for example, using the techniques disclosed in EP 583,814. The hydrophobically-modified polymer can have a principal backbone and, grafted on said principal backbone, randomly or not, at a substitution degree range comprised between 0.01 and 20 or between 0.01 and 20 and, preferentially, between approximately 0.03 and approximately 5 weight percent, pendant thermoassociative chains having an LCST property, i.e. the side chains can be hydrophilic below the LCST and hydrophobic above the LCST. A minimum value is desired to observe the viscosifying effect above the LCST whereas a maximum grafting ratio exists above which the TVE would precipitate. In fact, the substitution degree of the thermoassociative polymer is adjusted with a view to obtain a satisfactory fluid viscosity with sufficient polymer water solubility. It is helpful in this case to provide the side chain with an active site capable of cooperating for the grafting with a corresponding active site on the polymer skeleton.

Alternatively or additionally, the LCST polymers can be prepared by copolymerizing water soluble monomers, pre-polymers or macromonomers by known techniques, or forming water soluble sequences with monomers, prepolymers or macromonomers which are water soluble or capable of forming water soluble sequences and, either having the LCST property in the useful temperature range, or carrying a side chain having this property.

The polymer can be charged or non-charged, the charges being positive or negative and being located on the polymer backbone or on the pendant thermoassociative chains. An example of a non-charged thermoassociative polymer, which appears convenient for the implementation of the invention, is a guar modified by PEO or PPO chains.

An example of a positively charged thermoassociative polymer, where the charges are located on the polymer backbone, which also appears convenient for the implementation of the invention, is a chitosan modified by PEO or PPO chains. This polymer can be synthesized with various side chain substitution degrees following the route described by Yalpani, M. and Hall, L. D. Macromolecules, 1984, vol. 17, p. 272 which produces N-alkylated chitosan by reductive amination of the free amino groups of the chitosan or, following the route described in D. Plusquellec and al., ENSCR, Departement de Chimie Organique, An Efficient Acylation of Free Glycosylamines for the Synthesis of N-Glycosyl Amino Acids and N-Glycosidic Surfactants for Membranes Studies, J. Carbohydrate Chemistry, 1994, 13(5), 737-751, which, in such case, produces N-acylated chitosan with cleavable hydrophobic chains.

As a general rule, any type of water-soluble polymer can be used as the backbone provided it is sufficiently hydrophilic to prevent macroscopic phase separation of the system above the LCST of the grafts or side chains. The principal polymer backbone can be of a biological nature. It can be, notably, a polysaccharide. Suitable polysaccharides for the implementation of the invention are starch or starch derivatives such as starch phosphate, starch succinate, aminoalkyl starch or hydroxypropyl starch; cellulose or cellulose derivatives as carboxymethyl cellulose, methyl cellulose, ethyl cellulose or hydroxypropylmethyl cellulose; chitin or chitin derivatives such as the chitosan or chitosan derivatives such as the N-carboxybutyl chitosan or the N 30 carboxymethyl chitosan; galactomannans, in particular, guar and guar derivatives as the carboxymethyl guar or the carboxymethyl hydroxypropyl guar derivatives. It can also be a synthetic polymer such as a polyanhydride, for example the poly(isobutylene-alt-maleic anhydride), the poly(ethylene-alt 35 maleic anhydride), the poly(ethylene-graft-maleic anhydride), a polyacrylamide, a polyacrylate, a polyacrylate/polyacrylamide copolymer, a polyether, a polyester, a polyamide, a polyurethane, or a polyvinylalcohol.

The pendant hydrophobic chains are any polymer chain that can exhibit an LCST in a useful range of temperatures, for example, fully or partially saturated linear or branched hydrocarbon chains comprising preferably approximately 12 to 24 carbon atoms and including advantageously a cleavable or degradable group such as an acetal, an amide, an ether or an ester bond. A wide variety of polymers can be used for the LCST grafts provided they present a lower critical point in water such as polyethylene oxide (PEO), polypropylene oxide (PPO), polyvinylmethylether (PVME), poly N-isopropylacrylamide (PNIPAM), cellulosic derivatives, and the like. Polyether chains (PEO, PPO, copolymer of PEO and PPO) are the preferred option for the application since the PEO/PPO copolymers are low cost products that present a phase separation in the temperature range of interest, e.g. from 60° C. up to 200° C. in an embodiment, depending on their molecular weight. The side chains just mentioned can carry an active terminal group for grafting, notably an amine, acid, alcohol function to form an amide, ester, acid bound with the active groups of the polymer backbone. Particularly preferred in one embodiment, the side chains comprise polyalkylene oxide chains, especially polyethylene oxide, polypropylene oxide and the like, or a combination thereof.

An example of a non-charged hydrophobically-modified polymer, which appears convenient for the implementation of the invention, is a guar hydrophobically modified by non charged polyalkylene oxide chains.

An example of a positively charged hydrophobically-modified polymer, where the charges are located on the polymer backbone, which also appears convenient for the implementation of the invention, is a hydrophobically-modified chitosan. This polymer can be synthesized with various hydrophobic substitution degrees following the route described by Yalpani, M. and Hall, L. D. Macromolecules, 1984, vol. 17, p. 272 which produces N-alkylated chitosan by reductive amination of the free amino groups of the chitosan or, following the route described in D. Plusquellec and al., ENSCR, Departement de Chimie Organique, An Efficient Acylation of Free Glycosylamines for the Synthesis of N-Glycosyl Amino Acids and N-Glycosidic Surfactants for Membranes Studies, J. Carbohydrate Chemistry, 1994, 13(5), 737-751, which, in such case, produces N-acylated chitosan with cleavable hydrophobic chains. Further examples of hydrophobically-modified polymers suitable for the implementation of the invention are hydrophobically modified polyanhydrides, which can be obtained by an amidation or an esterification reaction of a polyanhydride such as a poly (isobutylele-alt-maleic anhydride), a poly(ethylene-alt-maleic anhydride) or a poly(ethylene-graft-maleic anLydride), with, respectively, an amine or an alcohol chain comprising between approximately 12 and approximately 24 carbon atoms.

These hydrophobically-modified polyanhydrides comprise carboxylic groups attached to their backbone, each carboxylic group being associated with one pendant thermoassociative hydrophobic chain. As a result, the hydrophobically-modified polyanhydrides are not only hydrophobic above the LCST, but also hydrophilic. Preferentially, the chemical structure of the pendant hydrophobic chains above the LCST corresponds to and, more preferentially, matches the hydrophobic tail of the VES molecules of the fluid. In such case, the whole chemical structure of the pendant hydrophobic chain and its associated carboxyl group forms an amphiphilic structure above the LCST corresponding to or matching the surfactant molecule structure, said carboxylic group being analogous to the charged hydrophilic head of the surfactant molecule.

In aqueous solution, it is commonly accepted that viscoelastic surfactant molecules assemble reversibly into a variety of spatially organized structures, whose common feature is the tendency for the hydrophobic tails to avoid any contact with water. So, under appropriate conditions of concentration, salinity, temperature, presence of counter ion, etc., small aqueous spherical micelles can undergo uniaxial growth and become wormlike. If the energy required to break a wormlike micelle into smaller parts is large enough, the rods become very long and they are then similar to semi-flexible linear polymer chains. When the concentration of surfactants in a viscoelastic fluid significantly exceeds a critical concentration called the overlap concentration, and in some cases, in the presence of an electrolyte, the system forms a network of entangled micellar chains which exhibits elastic behavior.

The surfactant used in the TVE in one embodiment is "viscoelastic" because, unlike numerous surfactants, which form Newtonian solutions with a viscosity slightly higher than water even at high concentrations, it is capable of forming viscoelastic fluids at a lower concentration. This specific rheological behavior is mainly due to the types of surfactant aggregates that are present in the fluids. In low viscosity fluids, the surfactant molecules aggregate in spherical micelles whereas, in viscoelastic fluids, long micelles, which can be described as worm-like, thread-like or rod-like micelles, are present and entangle.

The VES used in the invention in one embodiment can be ionic. It can be cationic, anionic or zwitterionic depending on the charge of its head group. When the surfactant is cationic in one embodiment, it is associated with a negative counterion, which can be an inorganic anion such as a sulfate, a nitrate, a perchlorate or a halide such as Cl—, Br or with an aromatic organic anion such as salicylate, naphthalene sulfonate, p- and m-chlorobenzoates, 3,5-, 3,4- and 2,4-dichlorobenzoates, t-butyl and ethyl phenate, 2,6- and 2,5-dichlorophenates, 2,4,5-trichlorophenate, 2,3,5,6-tetrachlorophenate, p-methyl phenate, m-chlorophenate, 3,5,6-trichloropicolinate, 4-amino-3,5,6-trichlorpicolinate, 2,4-dichlorophenoxyacetate, or the like. When the surfactant is anionic in an embodiment, it is associated with a positive counterion, for example, $Na^+$ or $K^+$. When it is zwitternionic in an embodiment, it is associated with both negative and positive counterions, for example, $Cl^-$ and $Na^+$ or $K^+$.

In one embodiment, the VES can have the formula R—Z wherein R is a hydrophobic tail comprising a fully or partially saturated, linear or branched hydrocarbon chain of at least 18 carbon atoms, and Z is a polar head group comprising —$NR1R2R3^+$, —$SO3^-$, —$COO^-$ or —$N^+(R1)(R2)(R3)$-$COO^-$ where R1, R2 and R3 are each independently hydrogen or a fully or partially saturated, linear or branched aliphatic chain of at least one carbon atom, and wherein R1 or R2 may optionally comprise a terminal hydroxyl group, e.g. a 5-hydroxy group.

In another embodiment, the VES can have the formula R—X—Y—Z wherein R is a hydrophobic tail comprising a fully or partially saturated, linear or branched hydrocarbon chain of at least 13 carbon atoms, X is a cleavable or degradable acetal, amide, ether or ester bond, Y is a spacer group formed by a short fully or partially saturated hydrocarbon chain of at least one carbon atom, Z is a polar head group comprising —$NR1R2R3^+$, —$SO3^-$, —$COO^-$ or —$N^+(R1)(R2)(R3)$-$COO^-$ where R1, R2 and R3 are each independently hydrogen or a fully or partially saturated, linear or branched aliphatic chain of at least one carbon atom. Due to the presence of the cleavable or degradable group, cleavable surfactants are able to degrade under downhole conditions. This type of cleavable VES is disclosed in International Patent Application WO02/064945.

In another embodiment, the VES can include a betaine surfactant having the general formula R—N(R1)(R2)-Z, where Z is an alkyl group, or R—CN(R1)(R2)(R3)-Z, where Z is an acyl group, wherein R is an aliphatic or aromatic, straight or branched, saturated or unsaturated hydrophobic group, Z is an anionic group of the surfactant comprising —R'—$SO3^-$ or —R'—$COO^-$ where R' is a saturated aliphatic chain and R1, R2 and R3 are each independently hydrogen or an aliphatic chain of at least one carbon atom.

In another embodiment, the VES can be a cationic N-erucyl-N,N-bis(2-hydroxyethyl)-N-methyl ammonium chloride. In an aqueous solution comprising 4 wt % NaCl or 3 wt % ACT, this viscoelastic surfactant forms a gel containing worm-like micelles that entangle at concentrations between 1.5 and 4.5 wt %. These worm-like micelles degrade in spherical micelles when the gel is broken by hydrocarbon.

Anionic viscoelastic surfactants suitable for the implementation of the invention are monocarboxylates RCOO— where R is saturated or unsaturated alkyl having from 12 to 30 carbon atoms such as oleate, or di- or oligomeric carboxylates such as disclosed in the International Patent Application WO 02/11874. These mono-, di- or oligomeric carboxylates form viscoelastic gels when in alkaline solution in the presence of added salts such as potassium chloride (KCl) or sodium chloride (NaCl). Worm-like micelles of said gel degrade to spherical micelles when the gel is broken by hydrocarbon.

Zwitterionic surfactants suitable for the implementation in the invention can be betaine surfactants having the general formula R-M(R1)(R2)-Z where Z is an alkyl group or R—CN (R1)(R2)(R3)-Z where Z is an acyl group. The hydrophobic group R can be aliphatic or aromatic, straight or branched, saturated or unsaturated. The anionic group Z of the surfactant can be —R'—SO3$^-$, or —R'—COO$^-$ where R' is a saturated aliphatic chain. R1, R2 and R3 are each independently hydrogen or an aliphatic chain of at least one carbon atom.

In other embodiments, the VES can be an oleyl amide succinate.

Advantageously, the viscoelastic surfactant concentration is below 10 wt %, preferentially, below 5 weight percent and below 30 or below 20 times c* where c* is the overlap concentration of the VES. More preferentially, it is comprised between 0.2 c* and 5 times c*. This corresponds to VES concentrations far below the viscoelastic surfactant concentration used in viscoelastic surfactant fracturing fluids of the prior art, which are of the order of 30-40 times c*.

In one embodiment, the TVE of the invention is hydrocarbon-responsive so that the gel structure breaks down on contact or mixing with hydrocarbons. The long viscoelastic surfactant micelles, which form, together with the thermally activated hydrophobically-modified polymer, the gel network, can degrade on contact with hydrocarbons to form spherical micelles. The hydrophobically-modified polymer concentration, which is under the entanglement concentration ce, is not sufficient to form an entangled network. Then, the viscosity of the gel decreases to value of about 100 cP or below, preferentially, 20 cP, at a high shear rate.

Other surfactants readily known to those of skill in the art, which do not necessarily impart viscoelastic properties into fluid into which they are incorporated, may be used in some embodiments of the invention. Such surfactant may be used in a well treatment fluid, or methods using such fluids, based upon a hydrophobically-modified polymer used in combination with the surfactant in an aqueous medium, where the polymer has a lower critical solution temperature, and where the fluid has a low viscosity at a temperature just below the lower critical solution temperature relative to the fluid viscosity just above the lower critical solution temperature. In some alternative embodiments, no surfactant is used in conjunction with the hydrophobically-modified polymer, the polymer having a lower critical solution temperature, and the fluid has a low viscosity at a temperature just below the lower critical solution temperature relative to the fluid viscosity just above the lower critical solution temperature.

The fluids used in embodiments of the invention can have a leak-off rate which is below the leak-off rate of pure VES or VES-only fluids (without thermoassociative polymer) of equivalent rheology. This is a very significant advantage: as a result, the responsive fluid of the invention can be used to fracture higher permeability formations as compared to the pure VES fluids. The fluid loss properties of the fluid can be further controlled by the addition of colloidal particles. Colloidal suspensions are typically dispersion of discrete very small particles, spherical or elongated in shape, charged so that the repulsion between the same charged particles stabilizes the dispersion. Disturbance of the charge balance due for instance by removing the water, changing the pH or adding salt or water-miscible organic solvent, causes the colloidal particles to aggregate resulting in the formation of a gel. The particles are less than 1 micron in size, and typically in the range from about 10 to about 100 nanometers. The dispersion is prepackaged as a liquid, transparent in the case of relatively low concentration of particles, becoming opalescent or milky at higher concentration. In any case, the dispersion can be handled as a liquid, which greatly simplifies the dosage. Commercial solutions of colloidal particles typically include silica (also known as silica sol) and oxides of aluminum, antimony, tin, cerium, yttrium and zirconium. The particles are mostly spherical with particles sizes usually range from about 8 nm to about 250 nm but elongated particles, with a length up to 300 nm are also available and were found to be also acceptable for the invention. The particles can have a negative or positive charge. To be effective as a fluid loss control agent, the solution of colloidal particles is typically added at a concentration between about 0.1 and 0.5% (ratio of volume of colloidal solution to the total volume).

Practically, all compounds of the TVE fluid of the invention are blended at surface together with the proppant, which can be, for example, a 20-40 mesh sand, bauxite or glass beads, for example. When maintained below the LCST, the viscosity of this fluid is sufficiently low to allow its pumping downhole. There, the pumped fluid, carrying the proppant, is injected into the formation rocks to be fractured under a high pressure. At that time, the fluid of the invention can be activated by heat transfer from the formation surrounding the well bore to provide heating above the LCST, so that the TVE becomes sufficiently viscous for carrying the proppant through the fracture. The fluid can thereafter degrade by contact with hydrocarbons flowing through the fracture.

In addition to the surfactant and the hydrophobically-modified polymer, the fluid of the invention can comprise salts including, for example, inorganic salts such as the chlorides of ammonium, sodium and potassium present in concentrations of about 1 to about 10 wt %, typically from about 3 to about 4 wt % or organic salts such as sodium salicylate. The fluid can also contain an organic solvent such as, for example, isopropanol, which can be used to liquefy the viscoelastic surfactant component. The fluid can also contain some fluid loss additive such as mixture of starch and mica in order to reduce fluid loss.

In some embodiments, the fluids used can further include a crosslinker. Adding crosslinkers to the fluid can further augment the viscosity of the fluid. Crosslinking consists of the attachment of two polymeric chains through the chemical association of such chains to a common element or chemical group. Suitable crosslinkers can comprise a chemical compound containing a polyvalent metal ion such as, but not necessarily limited to, chromium, iron, boron, aluminum, titanium, and zirconium.

Breakers can optionally be used in some methods of the invention. The purpose of this component is to "break" or diminish the viscosity of the fluid so that this fluid is even more easily recovered from the formation during cleanup. With regard to breaking down viscosity, oxidizers, enzymes, or acids can be used. Breakers reduce the polymer's molecular weight by the action of an acid, an oxidizer, an enzyme, or some combination of these on the polymer itself. In the case of borate-crosslinked gels, increasing the pH and therefore increasing the effective concentration of the active crosslinker, the borate anion, reversibly create the borate crosslinks. Lowering the pH can just as easily eliminate the borate/polymer bonds. At a high pH above 8, the borate ion exists and is available to crosslink and cause gelling. At lower pH, the borate is tied up by hydrogen and is not available for crosslinking, thus gelation caused by borate ion is reversible.

A fiber component can be included in the fluids used in the invention to achieve a variety of properties including improving particle suspension, and particle transport capabilities, and gas phase stability. Fibers used can be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component can be include at concentrations from about 1 to about 15 grams per liter of the liquid phase of the fluid, preferably the concentration of fibers are from about 2 to about 12 grams per liter of liquid, and more preferably from about 2 to about 10 grams per liter of liquid.

Conventional propped hydraulic fracturing methods, with appropriate adjustments if necessary, as will be apparent to those skilled in the art, are used in the methods of the invention. One preferred fracture stimulation treatment according to the present invention typically begins with a conventional pad stage to generate the fracture, followed by a sequence of stages in which a viscous carrier fluid transports proppant into the fracture as the fracture is propagated. Typically, in this sequence of stages the amount of propping agent is increased, normally stepwise. The pad and carrier fluid can be a gelled aqueous fluid, such as water or brine thickened with the TVE according to the present invention.

EXAMPLES

In the following examples, aqueous 3 weight percent potassium chloride solutions were prepared with (1) 2.5 weight percent of a thermosensitive polymer (Sample 1), or (2) 2 weight percent of the polymer and 0.5 weight percent of a viscoelastic surfactant (VES) (Sample 2).

The polymer was obtained from PolymerExpert, 16 avenue Pey Berland, 33607 Pessac Cedex, Bordeaux, France, PolymerExpert under the trade designation EG130, and was a block copolymer of polyethylene oxide (PEO) and polypropylene oxide (PPO) linked by urethane, urea and allophanate bonding units. The polymer was readily soluble in water and quickly dissolved in the brine at room temperature when the fluid samples were prepared.

The VES in Sample 2 was N-erucyl-N,N-bis(2-hydroxyethyl)-N-methyl ammonium chloride, used in the form of a liquid blend of the quaternary ammonium salt with 25 wt % isopropanol. This VES has an overlap concentration of about 1.2 mM in 400 mM KCl at 25° C., and critical micelle concentration of about $3.9 \times 10^{-2}$ mM as determined by interfacial tensiometry using the Nouy Ring Method at room temperature. Sample 1 thus represented a treatment fluid with polymer only, whereas Sample 2 represented a treatment fluid prepared according to an embodiment of the invention with both the polymer blend and VES, at an aggregate polymer plus VES concentration the same as the polymer concentration of Sample 1 (2.5 wt %) for the purpose of comparison.

Figure 1:
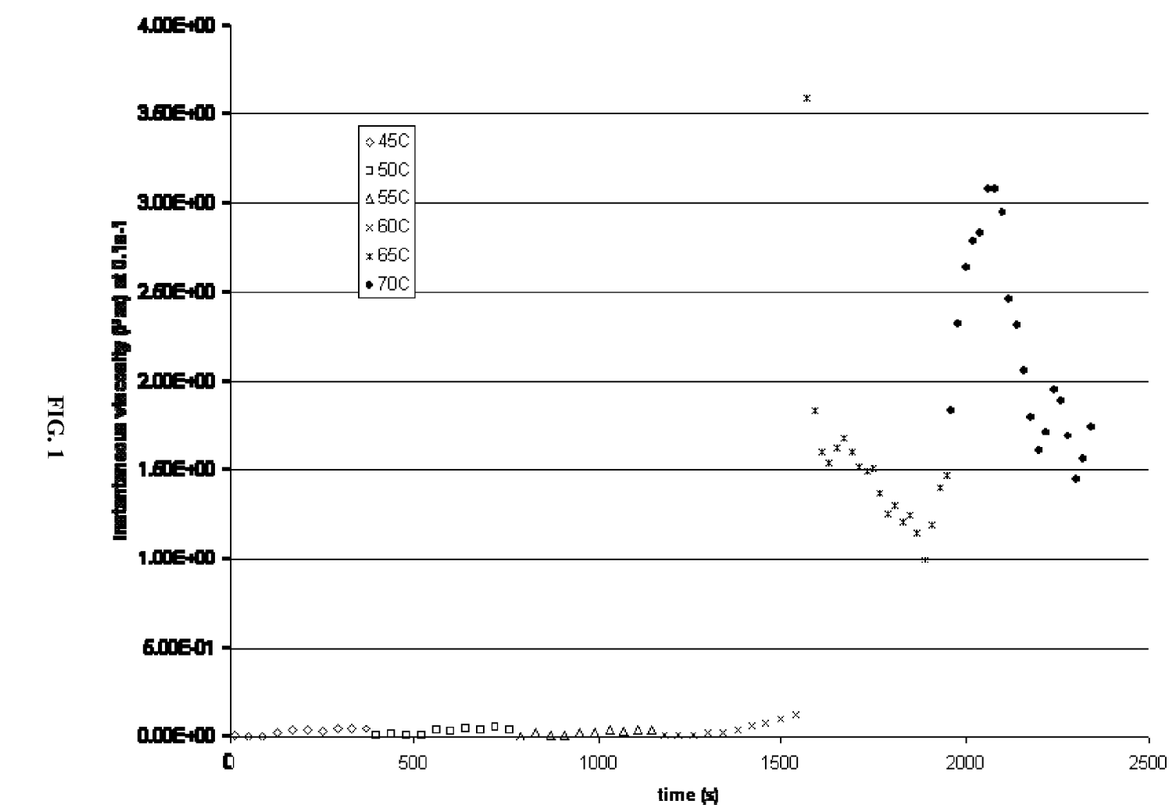
FIG. 1 is a viscosity profile of a treatment fluid comprising 2.5 weight percent of a thermosensitive polymer in an aqueous medium of 3 weight percent KCl, and shows the fluid viscosity above and below the lower critical solution temperature (LCST).
Figure 2:
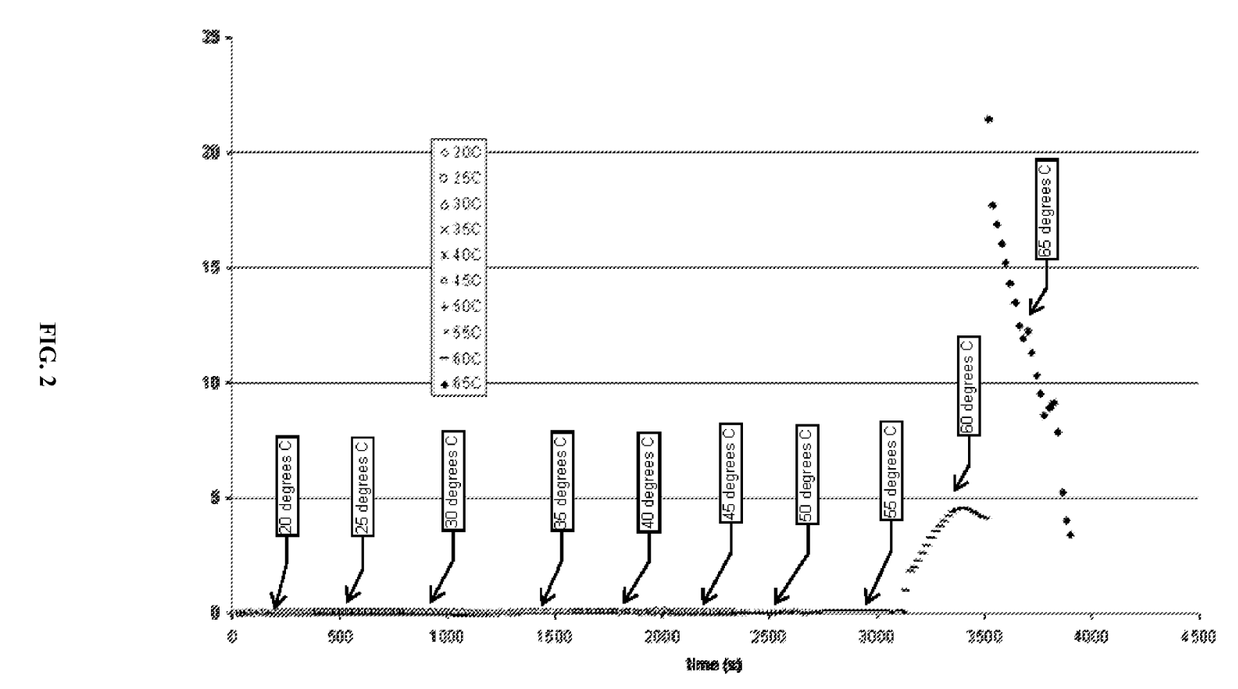
FIG. 2 is a viscosity profile of a treatment fluid according to an embodiment of the invention, comprising 2 weight percent of the thermosensitive polymer from FIG. 1 and 0.5 weight percent of a VES, and shows the viscosity above and below the LCST.

To determine the LCST for each sample, the instantaneous viscosity of the sample under a shear rate of $0.1$ $s^{-1}$ was measured and recorded while the sample was incrementally heated. As seen in FIG. 1, the LCST of Sample 1 was about 60° C. with a viscosity increasing from 0.03 Pa·s to 1.6 Pa·s at this temperature. As seen in FIG. 2, viscosity measurements were collected for Sample 2 at temperatures ranging from 20° C. to 65° C. The concentration of VES in Sample 2, by itself, was insufficient to significantly viscosify the fluid as demonstrated by the low viscosity exhibited at the lower temperatures. As with Sample 1, the Sample 2 LCST was also found to be about 60° C. However, the Sample 2 viscosity increased to about 4.5 Pa·s at the LCST demonstrating that the combination of VES and polymer in the TVE system had an unexpectedly synergistic effect, resulting in an even higher viscosity above the LCST when a portion of thermosensitive polymer was replaced with an equal portion by weight of VES.

Although the methods have been described here for, and are most typically used for, hydrocarbon production, they can also be used in injection wells and for production of other fluids, such as water or brine. The particular embodiments disclosed above are illustrative only, as the invention can be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above can be altered or modified and all such variations are considered within the scope and spirit of the invention. Accordingly, the protection sought herein is as set forth in the claims below.

All patents and other documents cited herein are fully incorporated herein by reference to the extent such disclosure is not inconsistent with this invention and for all jurisdictions in which such incorporation is permitted.

What is claimed is:

1. A thermoviscoelastic system fluid useful in a well treatment fluid, comprising:
    a polymer and a viscoelastic surfactant in an aqueous medium;
    wherein the polymer comprises a hydrophilic backbone and LCST grafts comprising a component selected from the group consisting of a polyalkylene oxide, a polyvinylmethylether, a poly N-isopropylacrylamide, a cellulosic derivative, and combinations thereof;
    wherein the polymer has a lower critical solution temperature (LCST); wherein the LCST grafts are hydrophilic below the LCST and hydrophobic above the LCST; and
    wherein the fluid has a low viscosity at a temperature just below the lower critical solution temperature relative to the fluid viscosity just above the lower critical solution temperature.

2. The well treatment fluid of claim 1 wherein the polymer is present at between its overlap concentration and its entanglement concentration.

3. The well treatment fluid of claim 1 wherein the polymer is soluble in the aqueous medium below its lower critical solution temperature.

4. The well treatment fluid of claim 1 wherein the viscoelastic surfactant and LCST grafts interact above the LCST to viscosify the fluid.

5. The well treatment fluid of claim 1 wherein the backbone is selected from the group consisting of polysaccharides, polyanhydrides, polyacrylamides, polyacrylates, polyacrylate copolymers, polyethers, polyesters, polyamides, polyurethanes, polyvinylalcohols acrylic and acrylamide polymers and copolymers, polysaccharides, chitins, polyanhydrides, polyethers, polyesters, polyamides, polyvinylalcohols, chitins, and combinations thereof.

6. The well treatment fluid of claim 1 wherein the LCST grafts comprise polyethylene oxide, polypropylene oxide, or a combination thereof.

7. The well treatment fluid of claim 1 wherein the polymer comprises a polyurethane backbone and a mixture of polyethylene oxide and polypropylene oxide as the LCST grafts.

8. The well treatment fluid of claim 1 wherein the polymer has a lower critical solution temperature between from 60° C. up to 200° C.

9. The well treatment fluid of claim 1 wherein the hydrophobically-modified polymer has a weight average molecular weight between 10,000 and 10,000,000 g/mol.

10. The well treatment fluid of claim 1 wherein the polymer has a weight average molecular weight between 100,000 and approximately 2,000,000 g/mol.

11. The well treatment fluid of claim 1 wherein the LCST grafts have a substitution degree from 0.01 to 10.

12. The well treatment fluid of claim 1 wherein the LCST grafts have a substitution degree from 0.05 to 5.

13. The well treatment fluid of claim 1 wherein the viscoelastic surfactant is present above its critical micelle concentration.

14. The well treatment fluid of claim 1 wherein the viscoelastic surfactant is present at from less than 30 times an overlap concentration of the viscoelastic surfactant.

15. The well treatment fluid of claim 1 wherein the viscoelastic surfactant is present at from less than 20 times an overlap concentration of the viscoelastic surfactant.

16. The well treatment fluid of claim 1 wherein the viscoelastic surfactant is present at from 0.2 to 5 times an overlap concentration of the viscoelastic surfactant.

17. The well treatment fluid of claim 1 wherein the viscoelastic surfactant is ionic.

18. The well treatment fluid of claim 1 wherein the viscoelastic surfactant is anionic.

19. The well treatment fluid of claim 1 wherein the viscoelastic surfactant is cationic.

20. The well treatment fluid of claim 1 wherein the viscoelastic surfactant is zwitterionic.

21. The well treatment fluid of claim 1, wherein the viscoelastic surfactant has the formula R—Z wherein R is a hydrophobic tail comprising a fully or partially saturated, linear or branched hydrocarbon chain of at least 18 carbon atoms, and Z is a polar head group comprising —NRIR2R3+, —S03-, —COO— or —N+(RI)(R2)(R3)-COO— where RI, R2 and R3 are each independently hydrogen or a fully or partially saturated, linear or branched aliphatic chain of at least one carbon atom, and wherein RI or R2 may optionally comprise a terminal hydroxyl group.

22. The well treatment fluid of claim 1, wherein the viscoelastic surfactant has the formula R—X—Y—Z wherein R is a hydrophobic tail comprising a fully or partially saturated, linear or branched hydrocarbon chain of at least 18 carbon atoms, X is a degradable acetal, amide, ether or ester bond, Y is a spacer group formed by a short fully or partially saturated hydrocarbon chain of at least one carbon atom, Z is a polar head group comprising —NRIR2R3+, —S03-, —COO— or —N\RI)(R2)(R3)-COO— where RI, R2 and R3 are each independently hydrogen or a fully or partially saturated, linear or branched aliphatic chain of at least one carbon atom.

23. The well treatment fluid of claim 1, wherein the viscoelastic surfactant comprises N-erucyl-N,N-bis(2-hydroxyethyl)-N-methyl ammonium chloride.

24. The well treatment fluid of claim 1, wherein the viscoelastic surfactant comprises a mono-, di- or poly-carboxylate.

25. The well treatment fluid of claim 1, wherein the viscoelastic surfactant comprises oleyl amide succinate.

26. The well treatment fluid of claim 1, wherein the viscoelastic surfactant comprises a betaine surfactant having the general formula R—N(RI)(R2)-Z, where Z is an alkyl group, or R—CN(RI)(R2)(R3)-Z, where Z is an acyl group, wherein R is an aliphatic or aromatic, straight or branched, saturated or unsaturated hydrophobic group, Z is an anionic group of the surfactant comprising —R'—S03- or —R'—COO— where R' is a saturated aliphatic chain and RI, R2 and R3 are each independently hydrogen or an aliphatic chain of at least one carbon atom.

27. The well treatment fluid of claim 1 wherein the polymer and the viscoelastic surfactant are present at an aggregate concentration from less than 10 percent by weight of the fluid.

28. The well treatment fluid of claim 1 wherein the polymer and the viscoelastic surfactant are present at an aggregate concentration from less than 5 percent by weight of the fluid.

29. The well treatment fluid of claim 1 wherein the aqueous medium comprises brine.

30. The well treatment fluid of claim 29 wherein the brine has a salt concentration from 1 to 10 percent by weight.

31. The well treatment fluid of claim 1 wherein the viscosity is sensitive to breaking by oil.

32. The well treatment fluid of claim 1, further comprising proppant.

33. The well treatment fluid of claim 1, further comprising a fluid loss control agent.

34. The well treatment fluid of claim 33 wherein the fluid loss control agent comprises colloidal particles.

* * * * *